US009542592B2

(12) United States Patent
Ding et al.

(10) Patent No.: US 9,542,592 B2
(45) Date of Patent: Jan. 10, 2017

(54) IMAGE PROCESSING METHOD AND APPARATUS

(71) Applicant: AVE Science & Technology Co., Ltd., Changsha, Hunan Province (CN)

(72) Inventors: Jianwen Ding, Changsha (CN); Fengliang Zhou, Changsha (CN)

(73) Assignee: AVE SCIENE & TECHNOLOGY CO., LTD., Hunan (CN)

( * ) Notice: Subject to any disclaimer, the term of this patent is extended or adjusted under 35 U.S.C. 154(b) by 56 days.

(21) Appl. No.: 14/576,031

(22) Filed: Dec. 18, 2014

(65) Prior Publication Data
US 2015/0104093 A1 Apr. 16, 2015

Related U.S. Application Data

(63) Continuation of application No. PCT/CN2012/079831, filed on Aug. 8, 2012.

(30) Foreign Application Priority Data

Jun. 21, 2012 (CN) .......................... 2012 1 0207706

(51) Int. Cl.
G06K 9/00 (2006.01)
G02B 21/36 (2006.01)
H04N 7/18 (2006.01)

(52) U.S. Cl.
CPC ......... *G06K 9/00147* (2013.01); *G02B 21/365* (2013.01); *G06K 9/0014* (2013.01); *G06K 9/00134* (2013.01)

(58) Field of Classification Search
CPC .............. G06K 9/00; G06T 7/00; G02B 21/00
(Continued)

(56) References Cited

U.S. PATENT DOCUMENTS 8,867,858 B2 * 10/2014 Fattal ...................... G06T 3/403
382/264
9,239,281 B2 * 1/2016 Manri .................. G01N 15/147
(Continued)

FOREIGN PATENT DOCUMENTS

CN 200780007642.2 3/2009
CN 200910077372.3 8/2010
(Continued)

OTHER PUBLICATIONS

Counterpart application, EP 12879202.5 Search Report.
(Continued)

*Primary Examiner* — Abolfazl Tabatabai
(74) *Attorney, Agent, or Firm* — Zareefa B. Flener; Flener IP Law, LLC

(57) ABSTRACT

The present invention discloses an image processing method and apparatus, where the method includes: downscaling an image to be processed; identifying identifiable targets in the downscaled image, and localizing temporary unidentifiable targets in the downscaled image; identifying the temporary unidentifiable targets at positions, corresponding to localized positions in the downscaled image, in the image to be processed. According to the present invention, only one object lens is needed to obtain the image to be processed, and no switching process between a high magnification lens and a low magnification lens is required during a target screening process; so that image identification speed is increased, and mechanical errors and offset in positioning are avoided.

17 Claims, 4 Drawing Sheets

(58) Field of Classification Search
USPC .... 382/133; 348/79, 136, 137; 324/434, 450
See application file for complete search history.

(56) References Cited

U.S. PATENT DOCUMENTS

| | | |
|---|---|---|
| 2006/0127880 A1 | 6/2006 | Harris |
| 2010/0149183 A1 | 6/2010 | Loewke |
| 2010/0158333 A1* | 6/2010 | Henkelman ........ G01N 21/4795 382/131 |
| 2011/0274336 A1 | 11/2011 | Nielsen et al. |
| 2012/0044342 A1 | 2/2012 | Hing |
| 2012/0113242 A1 | 5/2012 | Crandall et al. |

FOREIGN PATENT DOCUMENTS

| | | |
|---|---|---|
| CN | 201110103253.8 | 11/2011 |
| WO | 2008/131225 | 10/2008 |
| WO | 2011/071505 | 6/2011 |

OTHER PUBLICATIONS

Office Action, CN201210207706.6, filed Jun. 21, 2012, and published as CN102707425 on Oct. 3, 2012 and Translation thereof.
International Search Report for PCT/CN2012/079831 mailed on Mar. 28, 2013.
Written Opinion of the International Searching Authority for PCT/CN2012/079831 mailed on Mar. 28, 2013, and Translation thereof.

\* cited by examiner

IMAGE PROCESSING METHOD AND APPARATUS

CROSS-REFERENCE TO RELATED APPLICATION

This application is Continuation Application of PCT application Serial No. PCT/CN2012/079831, filed on Aug. 8, 2012 which claims priority from CN Patent Application Serial No. 201210207706.6, filed on Jun. 21, 2012, the entire contents of which are incorporated herein by reference for all purposes.

TECHNICAL FIELD

The present invention relates to the field of medical instruments, and in particular, to an image processing method and apparatus.

TECHNICAL BACKGROUND

Biological microscopes are instruments used for observing microbes, cells, bacteria, tissue culture, suspended substances, and sediments in medical and health institutions, institutions of higher education, and research institutes, and can be used for continuously observing reproduction and fission processes of cells and bacteria and the like in culture media. The biological microscopes are widely applied in the fields such as cytology, parasitology, oncology, immunology, genetic engineering, industrial microbiology, and phytology.

Generally, the sizes of animal cells and plant cells are between 10 µm and 100 µm, the size of a relatively small erythrocyte is less than 6 µm, and a platelet and a fungus have even smaller sizes, which may be less than 3 µm. To observe a tangible component in blood, urine, or other body fluids clearly, a microscope is required to have sufficient resolution. When observing a small target such as an erythrocyte, a leukocyte, or a platelet, a microscope is required to have resolution less than 1 µm. However, to observe a big target of a size greater than 10 µm, resolution is required to be less than 3 µm. (Note: resolution of a microscope refers to a capability of clearly distinguishing, by using the microscope, a minimum distance between two object points; and when the size of a cell is three times as large as minimum resolution, the number of clearly recognizable pixel points is seven, and in this case, only one pixel point is observable inside a cell. As is shown in FIG. 1, if the cell size is three times less than the minimum resolution, none structure inside the cell can be clearly observed.)

Common object lenses for biological microscopes used for cell analysis have three specifications, which are 10×, 20×, and 30×, respectively, and generally numerical apertures (NAs) corresponding to the three specifications are 0.25, 0.45, and 0.65, respectively. Therefore, resolution of a microscope can be calculated by:

$$d = \lambda/NA,$$

wherein λ is a wavelength of a light source, and NA is a numerical aperture of an object lens. Assuming that an average wavelength λ of a light source is 0.6 µm, resolution of different object lenses can be obtained as shown in Table 1 below.

TABLE 1

| Magnification of object lens | 10 | 20 | 40 |
|---|---|---|---|
| Numerical aperture (NA) | 0.25 | 0.45 | 0.65 |
| Resolution (d = λ/NA) | 2.4 µm | 1.33 µm | 0.923 µm |

As can be seen, to observe a small target such as a platelet and a fungus clearly (a microscope is required to have resolution less than 1 µm), an object lens whose numerical aperture is greater than 0.6 needs to be provided; a method of localizing with a low magnification lens (e.g. 10× lens) and tracking and identifying with a high magnification lens (e.g. 40× lens) is generally used for implementation (refer to Patent No. 201110315831.4 for details). However, during an observing process in which this method is used, object lenses need to be adjusted for switching between high and low magnification, operations are complex, and a mechanical error occurs easily, leading to an offset in positioning between high and low magnification and causing inaccurate positioning. In addition, due to the fluidity of a sample, the position of a target that is localized in low magnification may change when low magnification is switched to high magnification for observation, or even deviates from a field of view causing missed identification.

In view of the problem of inaccurate positioning because lenses with high and low magnification need to be switched during a target screening process in the prior art, an effective solution is yet to be proposed at present.

SUMMARY

The present invention provides an image processing method and apparatus, so as to solve the problem of inaccurate positioning because lenses with high and low magnification need to be switched during a target screening process in the prior art.

According to an embodiment of the present invention, an image processing method is provided, wherein the method includes:

downscaling an image to be processed;

identifying identifiable targets in the downscaled image, and localizing temporary unidentifiable targets in the downscaled image;

identifying the temporary unidentifiable targets at positions, corresponding to localized positions in the downscaled image, in the image to be processed.

According to another embodiment of the present invention, an image processing apparatus is provided, wherein the apparatus includes:

an image scaling unit, adapted to downscale an image to be processed;

a first image processing unit, adapted to identify identifiable targets in the downscaled image, and localize temporary unidentifiable targets in the downscaled image;

a second image processing unit, adapted to identify the temporary unidentifiable targets at positions, corresponding to localized positions in the downscaled image, in the image to be processed.

According to the present invention, an image to be processed is digitally downscaled and the downscaled image is used to identify identifiable targets and localize temporary unidentifiable targets, and then local identification for temporary unidentifiable targets is performed by finding out corresponding positions in the image to be processed according to a localizing result. In this case, during a target screening process, only one object lens is needed to obtain the image to be processed, and the process for switching between a high magnification lens and a low magnification lens is not required; so that image identification speed is increased, and mechanical errors and offset in positioning are avoided.

BRIEF DESCRIPTION OF THE DRAWINGS

The accompanying drawings described herein provide further understanding of the present invention and constitute a part of the present application. Exemplary embodiments of the present invention and description thereof are intended to illustrate the present invention without constituting an improper limit to the present invention. In the accompanying drawings.

DETAILED DESCRIPTION

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a", "an", and "the" include plural references. The meaning of "in" includes "in" and "on". The term "coupled" implies that the elements may be directly connected together or may be coupled through one or more intervening elements. Further reference may be made to an embodiment where a component is implemented and multiple like or identical components are implemented.

The order of the steps in the present embodiment is exemplary and is not intended to be a limitation on the embodiments of the present invention. It is contemplated that the present invention includes the process being practiced in other orders and/or with intermediary steps and/or processes.

Embodiment 1

Figure 1:
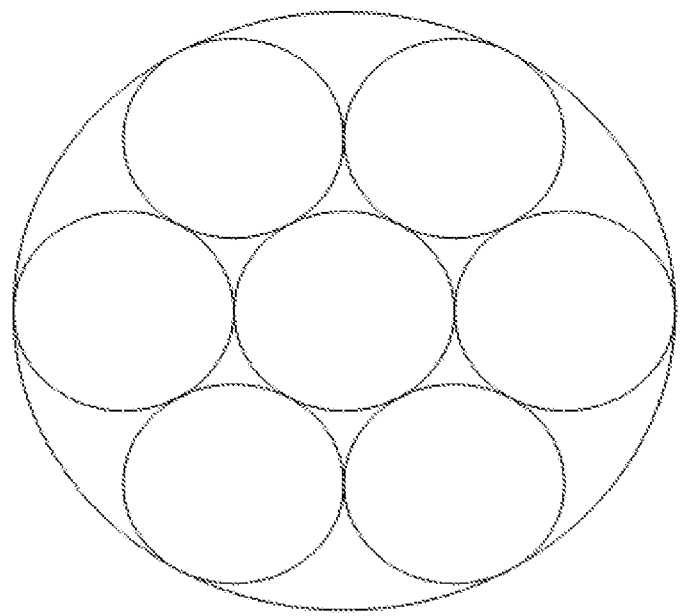
FIG. 1 is a preferred schematic diagram of a pixel point inside a cell according to the prior art.
Figure 2:
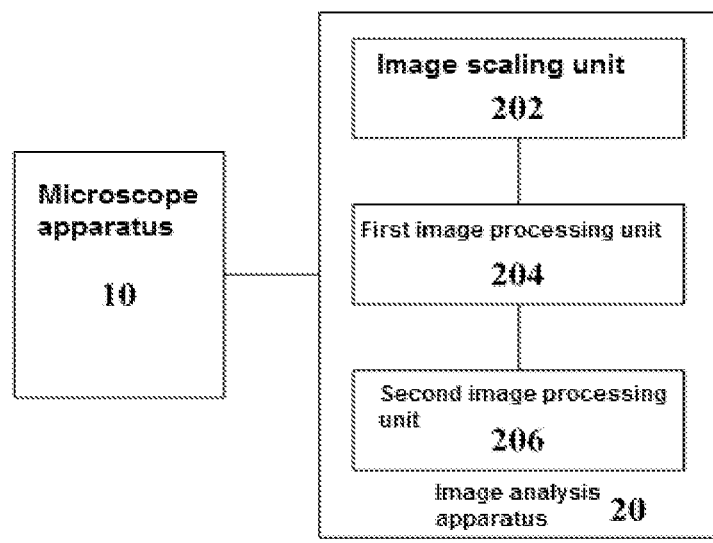
FIG. 2 is a preferred structural diagram of an image processing apparatus according to an embodiment of the present invention.

The present invention provides an image processing apparatus, and FIG. 2 is a preferred structural diagram of the apparatus. The image processing apparatus includes: a microscope apparatus 10 for obtaining a magnified first image of a test specimen, wherein magnification of an object lens of the microscope apparatus 10 is less than or equal to 20, and wherein a numerical aperture of the object lens is greater than or equal to 0.6; and an image analysis apparatus 20, where the image analysis apparatus 20 includes: an image scaling unit 202, connected to the microscope apparatus 10 for downscaling the first image obtained by the microscope apparatus by N times to obtain a second image, wherein N is an integer or a non-integer, and resolution of the second image is 1/N of that of the first image; a first image processing unit 204 for identifying identifiable targets in the second image, or further for classified counting the identifiable targets in the second image, and localizing temporary unidentifiable targets in the second image; and a second image processing unit 206, connected to the first image processing unit, and used for identifying at a position, corresponding to a localized position in the second image, in the first image. Preferably, the image analysis apparatus 20 further includes: a memory for storing the first image and the second image.

According to the foregoing preferred embodiment, a microscope apparatus in which magnification of an object lens is less than or equal to 20 and a numerical aperture of the object lens is greater than or equal to 0.6 is first used to collect a large image with high resolution, downscale the collected large image to obtain a small image with low resolution, and store the small image. During an image analysis process, the small image is first analyzed, identifiable targets are rapidly identified, classified and counted, temporary unidentifiable targets are localized, and then local identification is performed by finding out a corresponding position in the large image according to a localization result, so that an image identification speed is increased. In addition, a small image is obtained by electronically scaling a large image, and therefore the foregoing operation can be completed only by using a single object lens without needing to adjust the object lens to switch between a high magnification lens and a low magnification lens, which solves a problem of inaccurate positioning because switching between a high magnification lens and a low magnification lens needs to be performed during a target screening process, and whereby rapid and accurate analysis of a test specimen is achieved.

Detailed description is given with reference to examples in the following.

During a specimen test process, a specimen is first collected by using a microscope apparatus, where preferably, an object lens with low magnification and a large numerical aperture (to observe a small target such as a platelet and a fungus clearly, the numerical aperture is required to be 0.6 or above) is used in combination with a CCD camera with high resolution to collect an image of the specimen. An image collected by the microscope apparatus having such a structure not only maintains a large field of view of a low magnification object lens, but also keeps high definition. Preferably, the object lens chosen in the present invention is an object lens whose magnification is 20. A large image is collected and stored by using the CCD camera with high resolution, for example, a CCD camera whose resolution is 1600*1200 is used to collect an image of a 20× object lens, where definition of the large image collected by using the foregoing structure can reach definition of an image of a 40× object lens under an existing resolution of 800*600; and then the collected large image is downscaled to obtain a small image with low resolution, where preferably, the large image is downscaled by 4 times to obtain a small image with resolution of 800*600. After image scaling is completed, the large image and the small image are stored.

After the large image and the small image are stored, image analysis is performed and the stored small image is first analyzed. First, targets in the small image are rapidly screened, where relatively large identifiable targets in the small image are automatically identified, classified and counted, and meanwhile it is determined whether a small unidentifiable target exists in the image. When no small target exists in the image, the processing of a current field of view is finished without needing to switch to the large image for identification. When a small unidentifiable target exists, the small target is localized, and then the local identification is performed at a corresponding position in the large image according to a localized position in the small image, so that an image identification speed is increased.

Figure 3:
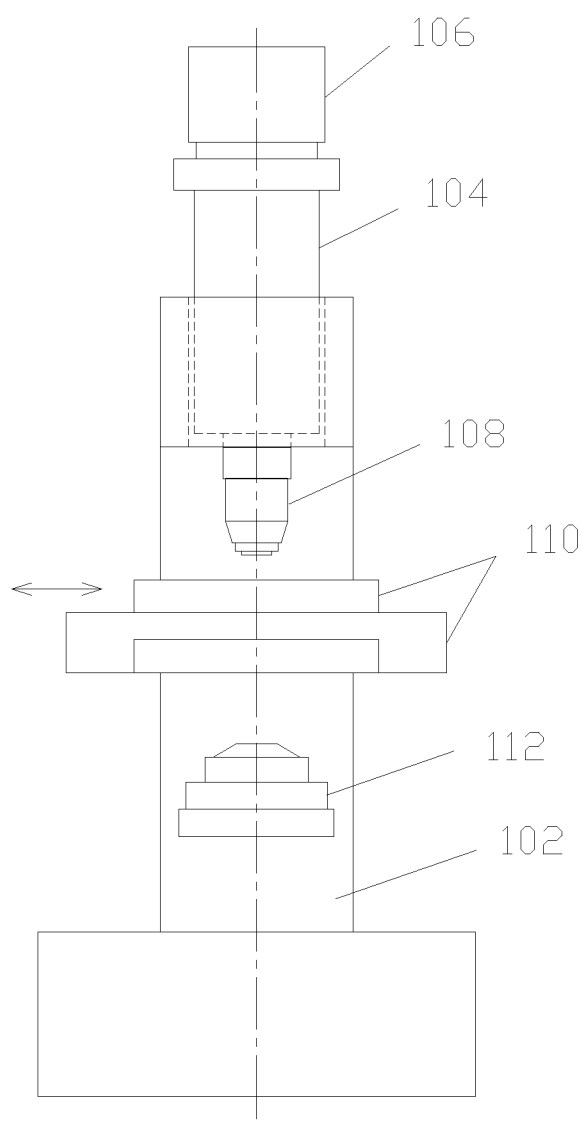
FIG. 3 is a front view of a microscope apparatus of an image processing apparatus according to an embodiment of the present invention.
Figure 4:
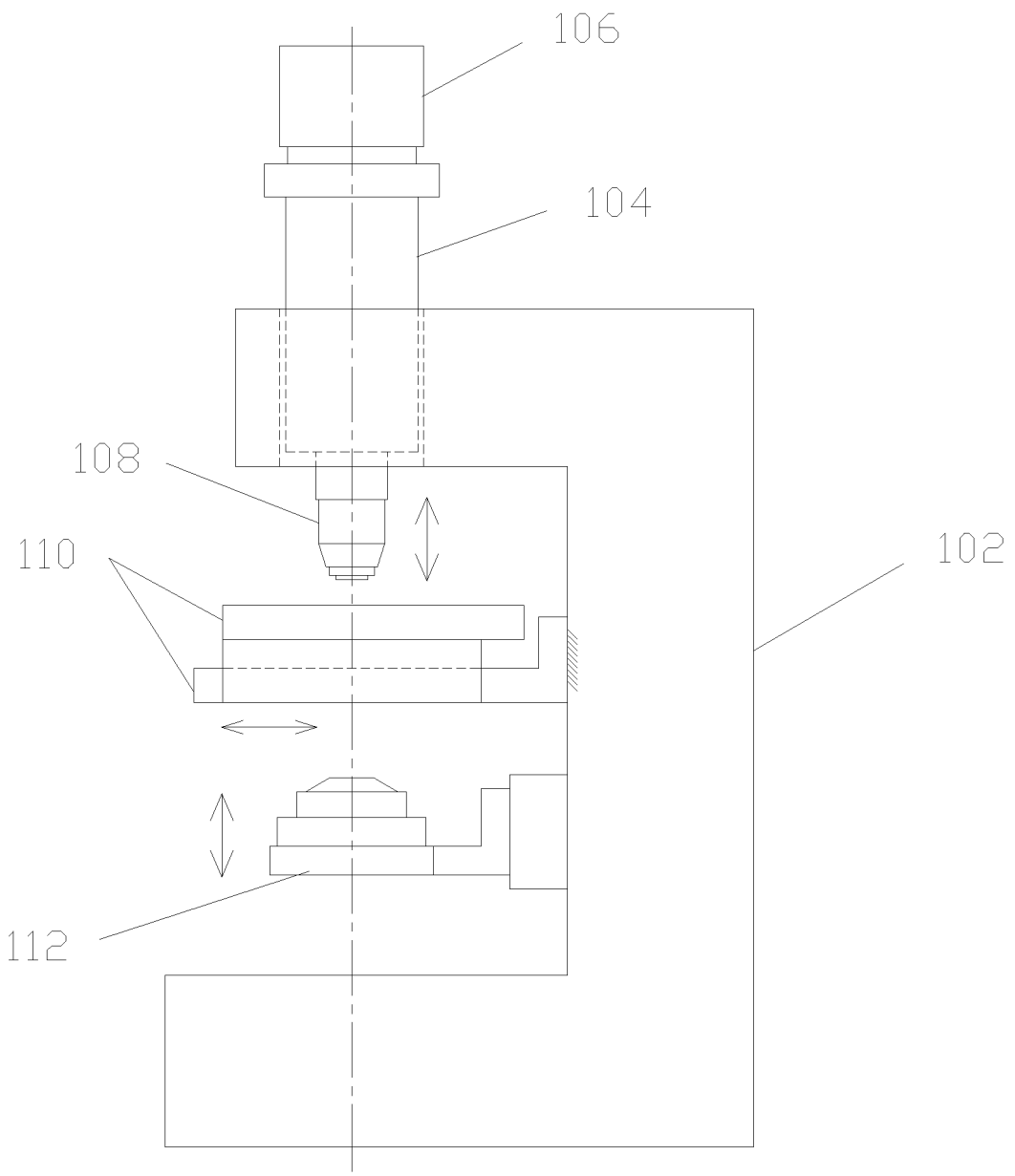
FIG. 4 is a right view of the microscope apparatus according to FIG. 3.

The present invention further provides a preferred embodiment of the foregoing microscope apparatus 10. Specifically, FIG. 3 is a front view of the microscope apparatus 10, and FIG. 4 is a right view of the microscope apparatus 10. The microscope apparatus 10 includes: a microscope frame 102, provided with a vertical through hole facing downwards; an adaptive interface 104, disposed in the through hole of the microscope frame 102, wherein an upper end of the adaptive interface 104 is provided with a stop flange; a CCD camera 106, fixedly disposed at an upper end surface of the adaptive interface 104, wherein preferably resolution of the CCD camera 106 is greater than or equal to 2 megapixels; an object lens 108, fixedly disposed at a lower end surface of the adaptive interface 104 and extends along a direction leaving the adaptive interface 104; a stage assembly 110, located below the object lens 108, wherein the stage assembly 110 and the object lens 108 are disposed correspondingly; and a condenser lens 112, where the condenser lens 112 and the stage assembly 110 are disposed correspondingly. A focus of the CCD camera 106, the center of the object lens 108, and the center of the condenser lens 112 are located at a same vertical line.

The present invention further provides a preferred solution of the stage assembly 110, the object lens 108, and the condenser lens 112. Specifically, the stage assembly 110 includes a fixed component and a sliding component, where the fixed component is fixedly connected to the microscope frame 102, the sliding component is slidably disposed on the fixed component along a horizontal direction, and preferably the foregoing sliding component can slide along the horizontal direction separately in a length direction or in a width direction. The object lens 108 is disposed along a perpendicular direction in a vertically movable manner, and the condenser lens 112 is movably disposed below the stage assembly along a vertical direction. In FIG. 3, a direction of the arrow indicates a sliding direction of the stage assembly 110. In FIG. 4, a direction of the vertical arrow at the top indicates a sliding direction of the object lens 108, a direction of the vertical arrow at the bottom indicates a moving direction of the condenser lens 112, and a direction of the horizontal arrow indicates a sliding direction of the stage assembly 110.

The present invention further optimizes the foregoing microscope apparatus 10. As a preferred solution, the apparatus further includes a microscope transmission control apparatus for controlling the movement of the stage assembly 110, the object lens 108, and the condenser lens 112. Specifically, the microscope transmission control apparatus is separately connected to a horizontal moving structure of the stage assembly 110, a vertical moving structure of the object lens 108, and a vertical moving structure of the condenser lens 112, so as to achieve an effect of controlling the movement of the stage assembly 110, the object lens 108, and the condenser lens 112. Preferably, precision of movement of the stage assembly in a length direction or in a width direction controlled by the microscope transmission control apparatus in the present invention is less than three 3 μm, and precision of vertical movement of the object lens controlled by the microscope transmission control apparatus is less than 0.5 μm.

According to above description, in an embodiment of the present invention, the microscope apparatus may further include a processor and memory; computer-readable instructions is installed in the memory; when those computer-readable instructions are read, the processor may execute the function of the image analysis apparatus.

In another embodiment of the present invention, a client/terminal including a processor and memory which stores computer-readable instructions is connected to the microscope apparatus. When the computer-readable instructions are read, the processor may execute the function of the image analysis apparatus.

In another embodiment of the present invention, portal or all of the image analysis apparatus are tangible hardware, which could be connected with the microscope apparatus.

The preferred embodiment of the foregoing microscope apparatus is more advantageous to the stability of a focal distance of the microscope apparatus. Specifically, an existing microscope apparatus has a structure with multiple object lenses, so that when an object lens is switched, a certain gap must exist because a lens is movable, which definitely affects the stability of the focal distance. Next, a stage assembly in a previous structure needs to perform three-dimensional movement, so that when the stage assembly moves in a length or a width direction, an elevating mechanism of the stage assembly may be affected to cause a change of the focal distance because the stage assembly is heavy and an elevating direction of the stage assembly is not fixed. However, vertical movement of the stage assembly in the foregoing structure is fixed, and movement of the stage assembly in a horizontal direction does not affect or cause any change of the focal distance of the microscope apparatus, so that the focal distance of microscope apparatus is more stable when a view position changes in a horizontal direction.

Embodiment 2

Figure 5:
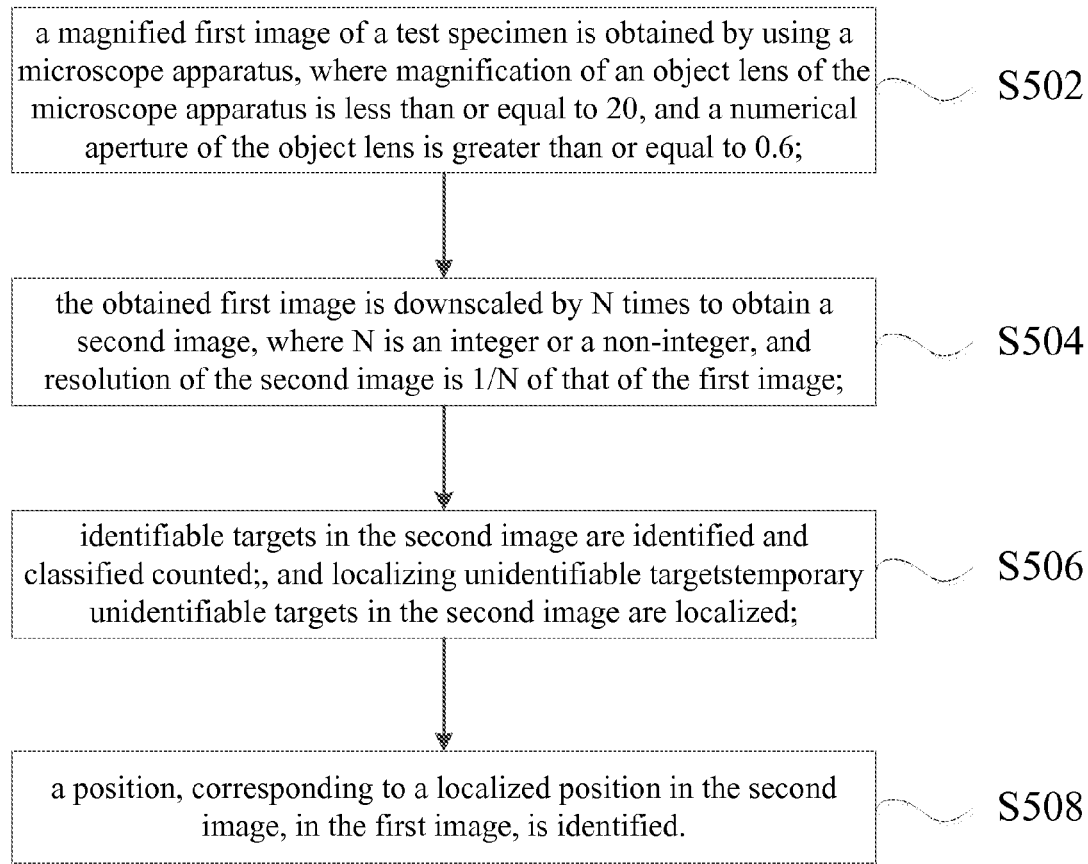
FIG. 5 is a preferred flowchart of an image processing method according to an embodiment of the present invention.

On the basis of the foregoing image processing apparatus, the present invention further provides an image processing method. FIG. 5 is a preferred flowchart of an image processing method, where the method includes the following steps.

S502: a magnified first image of a test specimen is obtained by using a microscope apparatus, where magnification of an object lens of the microscope apparatus is less than or equal to 20, and a numerical aperture of the object lens is greater than or equal to 0.6. Preferably, the first image is obtained by using a CCD camera of the microscope apparatus, and resolution of the CCD camera is greater than or equal to 2 megapixels.

In an embodiment, the magnified first image of a test specimen may be obtained by other methods, the way for obtaining the magnified first image of a test specimen could not be used to limit the scope of the embodiment.

S504: the obtained first image is downscaled by N times to obtain a second image, where N is an integer or a non-integer, and resolution of the second image is 1/N of that of the first image. Preferably, the first image and the second image are stored.

S506: identifiable targets in the second image are identified and classified counted; and temporary unidentifiable targets in the second image are localized.

Those skilled in the art can understand it is not necessary to classify or count the identifiable targets, the classification or counting may be implemented according to a specific requirement.

S508: a position, corresponding to a localized position in the second image, in the first image, is identified.

In the foregoing preferred embodiment, a microscope apparatus in which magnification of an object lens is less than or equal to 20 and a numerical aperture of the object lens is greater than or equal to 0.6 is first used to collect a large image with high resolution, downscale the collected large image to obtain a small image with low resolution, and store the small image. During an image analysis process, the small image is first analyzed, targets in the small image are rapidly screened, where relatively large identifiable targets in the small image are automatically identified, classified and counted, and meanwhile it is determined whether a small unidentifiable target exists in the image. When no small target exists in the image, the processing of a current field of view is finished without needing to switch to the large image for identification. When a small unidentifiable target exists, the small target is localized, and then local identification is performed by finding out a corresponding position in the large image according to a localization result, so that an image identification speed is increased. In addition, a small image is obtained by electronically scaling a large image, and therefore the foregoing operation can be completed only by using a single object lens without needing to adjust the object lens to switch between a high magnification lens and a low magnification lens, which solves a problem of inaccurate positioning because switching between a high magnification lens and a low magnification lens needs to be performed during a target screening process, and implements rapid and accurate analysis of a test specimen.

In an embodiment, it may directly magnify the downscaled image at the positions, corresponding to the localized positions; and temporary unidentifiable targets may be directly identified in the magnified downscaled image. At this situation, the magnification ratio of the downscaled image can be determined according to the size of the temporary unidentifiable targets.

Specific description is given with reference to examples in the following:

During a specimen test process, a specimen is first collected by using a microscope apparatus, where preferably, an object lens with low magnification and a large numerical aperture (to observe a small target such as a platelet and a fungus clearly, the numerical aperture is required to be 0.6 or above) is used in combination with a CCD camera with high resolution to collect an image of the specimen. Preferably, resolution of the CCD camera is greater than or equal to 2 megapixels. An image collected by the microscope apparatus having such a structure not only maintains a large field of view of a low magnification object lens, but also keeps high definition. Preferably, the object lens chosen in the present invention is an object lens whose magnification is 20. A large image is collected and stored by using the CCD camera with high resolution, for example, a CCD camera whose resolution is 1600*1200 is used to collect an image of a 20× object lens, where definition of the large image collected by using the foregoing structure can reach definition of an image of a 40× object lens under an existing resolution of 800*600; and then the collected large image is downscaled to obtain a small image with low resolution, where preferably, the large image is downscaled by 4 times to obtain a small image with resolution of 800*600. After image scaling is completed, the large image and the small image are stored.

After the large image and the small image are stored, image analysis is performed and the stored small image is first analyzed. First, targets in the small image are rapidly screened, where relatively large identifiable targets in the small image are automatically identified, classified and counted, and meanwhile it is determined whether a small unidentifiable target exists in the small image. When no small target exists in the image, the processing of a current field of view is finished without needing to switch to the large image for identification. When a small unidentifiable target exists in the small image, the small target is localized, and then the local identification is performed at a corresponding position in the large image according to a localized position in the small image, so that an image identification speed is increased.

As can be seen from the foregoing description, the present invention implements the following technical effects.

By adopting the foregoing method, a downscaled image is used to perform screening and localizing a small target to ensure rapid image identification. For A localized small target it is directly switched into a corresponding position in an original image to obtain a clear large image of the corresponding target, so as to facilitate implementation of accurate identification. Further, because a small image is downscaled proportionally from an original large image, problems of inaccurate positioning and cell displacement in a conventional analysis method because by a high magnification lens and a low magnification lens are separately used to localize and collect an image are avoided; a phenomenon that a target exists in low magnification but disappears in high magnification in a conventional method can be completely avoided; and the occurrence of missed identification is thoroughly avoided.

A switching mechanism of an object lens is structurally omitted and an object lens is fixed, so that focusing becomes more stable. Because there is only one lens and positions of a condenser lens and an aperture also need not to be adjusted, an adjustment mechanism of the entire microscope apparatus is reduced to three axes from original five axes. After a stage is leveled, elevation adjustment of the stage may also be canceled, and the original five-axis automatic adjustment can be further reduced to 2-axis adjustment. A reduction in the adjustment mechanism not only lowers a control cost but also greatly improves the stability of the microscope apparatus.

The foregoing descriptions are merely preferred embodiments of the present invention, but are not intended to limit the present invention. A person skilled in the art may make various modifications and changes to the present invention. Any modification, equivalent replacement, and improvement made without departing from the spirit and principle of the present invention shall fall within the protection scope of the present invention.

The invention claimed is:

1. A computer-based image processing method, comprising:
   downscaling an image to be processed to obtain a downscaled image;

identifying identifiable targets in the downscaled image, and localizing temporary unidentifiable targets in the downscaled image;

identifying the temporary unidentifiable targets at positions, corresponding to localized positions in the downscaled image, in the image to be processed.

2. The method of claim 1, wherein, resolution of the downscaled image is 1/N of that of the image to be processed; wherein N is an integer.

3. The method of claim 1, further comprising:
classified counting targets identified.

4. The method of claim 1, further comprising:
storing the downscaled image and the image to be processed.

5. The method of claim 1, wherein, the image to be processed is an image of a test specimen which is captured by a microscope apparatus with one object lens.

6. The method of claim 5, wherein, magnification of the object lens of the microscope apparatus is less than or equal to 20, and a numerical aperture of the object lens is greater than or equal to 0.6.

7. The method of claim 5, wherein, the image of the test specimen is captured by a CCD camera of the microscope apparatus, and resolution of the CCD camera is greater than or equal to 2 megapixels.

8. An image processing apparatus, comprising a computer-based image analysis apparatus, wherein, the image analysis apparatus comprises:
an image scaling unit, adapted to downscale an image to be processed to obtain a downscaled image;
a first image processing unit, adapted to identify identifiable targets in the downscaled image, and localize temporary unidentifiable targets in the downscaled image;
a second image processing unit, adapted to identify the temporary unidentifiable targets at positions, corresponding to localized positions in the downscaled image, in the image to be processed.

9. The image processing apparatus of claim 8, further comprising:
a microscope apparatus, adapted to capture a test specimen which has been magnified to obtain the image to be processed.

10. The image processing apparatus of claim 9, wherein, the microscope apparatus comprises:
one object lens, adapted to magnify the test specimen;
a CCD camera, adapted to capture the test specimen which has been magnified by the object lens.

11. The image processing apparatus of claim 10, wherein, the microscope apparatus further comprises:
a microscope frame, provided with a vertical through hole facing downwards;
an adaptive interface, disposed in the through hole of the microscope frame, wherein an upper end of the adaptive interface is provided with a stop flange; wherein, the CCD camera is fixedly disposed at an upper end surface of the adaptive interface; the object lens is fixedly disposed at a lower end surface of the adaptive interface and extends along a direction leaving the adaptive interface;
a stage assembly, located below the object lens, wherein the stage assembly and the object lens are disposed correspondingly; and
a condenser lens, wherein the condenser lens and the stage assembly are disposed correspondingly, wherein
a focus of the CCD camera, the center of the object lens, and the center of the condenser lens are located at a same vertical line.

12. The image processing apparatus of claim 11, wherein, the stage assembly comprises:
a fixed component and a sliding component, wherein the fixed component is fixedly connected to the microscope frame, and the sliding component is slidably disposed on the fixed component along a horizontal direction; and
the object lens is disposed along a perpendicular direction in a vertically movable manner.

13. The image processing apparatus of claim 11, wherein the condenser lens is movably disposed below the stage assembly along a vertical direction.

14. The image processing apparatus of claim 11, wherein, the microscope apparatus further comprises:
a microscope transmission control apparatus for controlling the movement of the stage assembly, the object lens, and the condenser lens.

15. The image processing apparatus of claim 10, wherein, magnification of the object lens of the microscope apparatus is less than or equal to 20, and a numerical aperture of the object lens is greater than or equal to 0.6.

16. The image processing apparatus of claim 10, wherein, the CCD camera of the microscope apparatus, and resolution of the CCD camera is greater than or equal to 2 megapixels.

17. The image processing apparatus of claim 8, wherein, the image analysis apparatus further comprises:
a memory, adapted to store the downscaled image and the image to be processed.

* * * * *